H. ALBRECHT.
Christmas-Tree Holder.
No. 224,624. Patented Feb. 17. 1880.
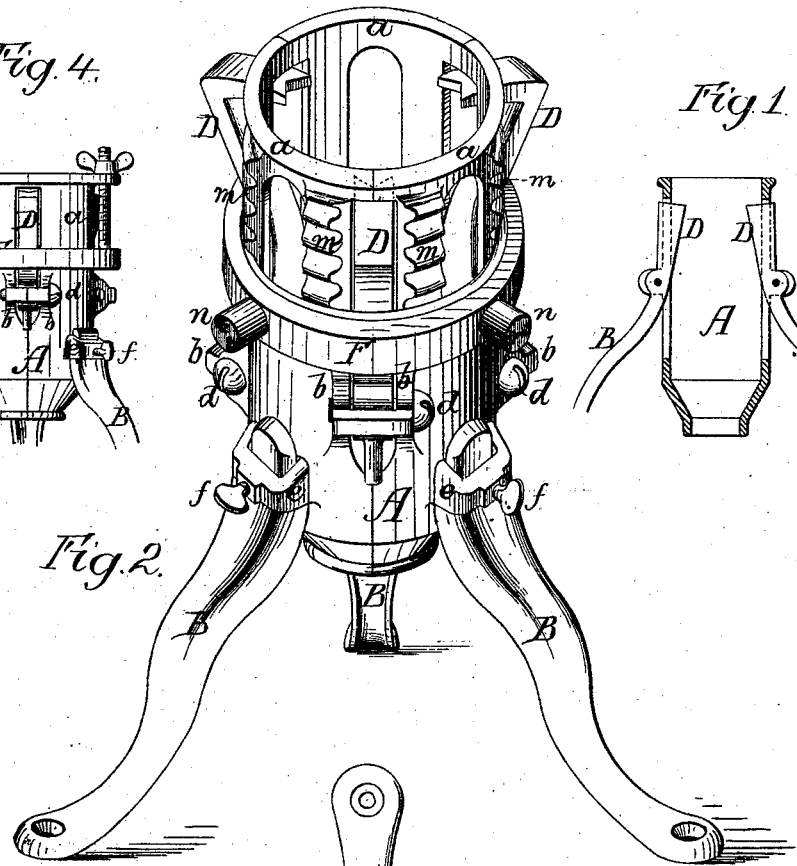

UNITED STATES PATENT OFFICE.

HERMANN ALBRECHT, OF PHILADELPHIA, PENNSYLVANIA.

CHRISTMAS-TREE HOLDER.

SPECIFICATION forming part of Letters Patent No. 224,624, dated February 17, 1880.

Application filed December 29, 1879.

*To all whom it may concern:*

Be it known that I, HERMANN ALBRECHT, a citizen of the United States, residing at Philadelphia, Pennsylvania, have invented an Improvement in Christmas-Tree Holders, of which the following is a specification.

This invention relates to a certain improvement in the Christmas-tree holder for which Letters Patent of the United States, No. 183,100, were granted to my assignees on the 10th day of October, A. D. 1876. This patented device, which is shown in the diagram, Figure 1, of the accompanying drawings, consists of a socket, A, to which the stem of the tree is adapted, the socket having pivoted legs B, the upper ends of which project beyond the pivots, so as to form clamping-jaws D, which grasp the said stem of the tree and hold it in place. In this case the position of the jaws D is governed by the position of the legs B, which are screwed to a table or other support, so that when the stem of the tree becomes reduced in diameter by shrinkage, or the jaws fail to exercise a proper clamping effect, a readjustment of the legs B becomes necessary.

The object of my present improvement is to provide for the secure confinement of the tree irrespective of the means of support for the socket, the improvement consisting in hanging the clamping-jaws to the socket independently of the legs and combining said jaws with devices whereby they may be contracted or expanded, as desired.

In the accompanying drawings, Fig. 2 is a perspective view of a Christmas-tree holder with my improvements; Fig. 3, a plan view of the same, and Fig. 4 a view of a modification.

The socket A is made in three segments, *a*, confined together by means of bolts *d* passing through lugs *b*, the bolts serving also as pivots for the three clamping-jaws D, which are adapted to openings in the socket in the same manner as in the patented device above referred to. The legs B, however, instead of forming continuations of the jaws D, are separate therefrom and are adapted to sockets *e* on the segments *a*, being secured in said sockets by means of set-screws *f*.

A screw-thread, *m*, is formed on the exterior of the socket, the continuity of the thread being interrupted at intervals by openings in the said socket, and to the threaded portion of the socket is adapted an internally-threaded ring, F, provided with suitable projecting pins *n* for facilitating its manipulation. On screwing this ring upward it will act on the jaws D so as to contract the same to the stem of the tree, and on screwing down the ring it will be lowered and the jaws will be at liberty to be moved outward. By this means the secure confinement of the stem of the tree is effected without the necessity of disturbing the legs.

Instead of threading the ring and socket, the former may be provided with threaded stems adapted to thumb-screws bearing on a flange or lugs on the said socket, as shown in Fig. 4.

I claim as my invention—

1. The combination of the socket A, the legs B, the clamping-jaws D, hung to the socket independently of the legs, and means, substantially as described, for operating the said jaws D, as specified.

2. The combination of the threaded socket A, the legs B, and the clamping-jaws D with the threaded ring F, as described.

In testimony whereof I have signed my name to this specification in the presence of two subscribing witnesses.

HERMANN ALBRECHT.

Witnesses:
 ALEXANDER PATTERSON,
 HARRY SMITH.